US 6,605,656 B2

(12) United States Patent
Ryntz et al.

(10) Patent No.: US 6,605,656 B2
(45) Date of Patent: Aug. 12, 2003

(54) SURFACE PROPERTIES IN THERMOPLASTIC OLEFIN ALLOYS

(75) Inventors: Rose A. Ryntz, Clinton Township, MI (US); Beth M. Wichterman, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/725,420

(22) Filed: Nov. 29, 2000

(65) Prior Publication Data

US 2002/0095006 A1 Jul. 18, 2002

(51) Int. Cl.[7] .................. C08L 23/00; C08L 83/04; C08L 77/00
(52) U.S. Cl. ................. 523/206; 523/212; 525/101; 525/179; 524/506; 524/536; 524/538
(58) Field of Search ................... 523/205, 206, 523/212; 525/63, 66, 179, 101; 524/538, 506, 536

(56) References Cited

U.S. PATENT DOCUMENTS

| | | | | |
|---|---|---|---|---|
| 4,234,702 A | * | 11/1980 | Nakamura | ............... 525/100 |
| 4,616,064 A | * | 10/1986 | Zukosky et al. | ........... 525/92 |
| 5,013,815 A | * | 5/1991 | Genz et al. | ............... 528/171 |
| 5,036,141 A | * | 7/1991 | Toyoshima et al. | ......... 525/286 |
| 5,145,891 A | | 9/1992 | Yasukawa et al. | |
| 5,162,422 A | * | 11/1992 | Lausberg et al. | |
| 5,206,284 A | | 4/1993 | Fukui et al. | |
| 5,312,867 A | * | 5/1994 | Mitsuno et al. | ............ 525/66 |
| 5,317,059 A | * | 5/1994 | Chundury et al. | .......... 525/66 |
| 5,489,640 A | | 2/1996 | Riding | |
| 5,504,130 A | | 4/1996 | Riding | |
| 5,534,335 A | * | 7/1996 | Everhart et al. | ........... 442/347 |
| 5,575,570 A | * | 11/1996 | Uchiyama et al. | ......... 384/470 |
| 5,900,306 A | * | 5/1999 | Stopper | ................ 428/198 |
| 5,936,039 A | * | 8/1999 | Wang et al. | ............... 525/178 |
| 5,973,070 A | | 10/1999 | Baann | |
| 6,051,649 A | * | 4/2000 | Alex et al. | ................ 525/66 |

FOREIGN PATENT DOCUMENTS

| | | | |
|---|---|---|---|
| EP | 0 456 259 | * | 11/1991 |
| EP | 0262233 | * | 5/1999 |
| JP | 45-30945 | | 10/1970 |
| JP | 1282267 | * | 11/1989 |
| JP | 1-318051 | | 12/1989 |
| WO | WO 87/01990 | * | 4/1987 |
| WO | WO 99 25767 | * | 5/1999 |

OTHER PUBLICATIONS

"Scratch Resistance and Material Property Relationship in Polymers", C.Xiang and H.J. Sue, J. Chu, Annual Technical Conference of the Society of Plastic Engineers, ANTEC '99, pp. 3463–3467.
Effects of Additives on Scratch Resistance of Polypropylene Materials, J. Chu, Annual Technical Conference of the Society of Plastic Engineers, ANTEC '99, pp. 2943–2946.
"Siloxane Masterbatches as Scratch Resistance Additive for TPO Compounds", J. Chappelle, K. Ryan, Society of Plastic Engineers TPO Automotive Proceedings, 2000, pp. 287–300.

\* cited by examiner

*Primary Examiner*—Callie Shosho
(74) *Attorney, Agent, or Firm*—Brinks Hofer Gilson & Lione

(57) ABSTRACT

A thermoplastic olefin resin composition having improved resistance to surface impacts, such as scratching, marring and gouging, is provided. The thermoplastic olefin resin comprises a blend of polyolefin alloy and polyamide components. The components have relative melt flow rates such that the polyamide component is selectively segregated toward the front of a melt flow. A compatibilizing agent is added to overcome the natural incompatibility of the polyolefin alloy and polyamide components of the resin. The thermoplastic olefin resin may further include a filler material when increased stiffness or modulus is desired.

19 Claims, No Drawings

SURFACE PROPERTIES IN THERMOPLASTIC OLEFIN ALLOYS

FIELD OF THE INVENTION

The present invention relates generally to a thermoplastic resin composition that demonstrates improved surface durability properties. More specifically, the invention relates to a polyolefin alloy blended with a polyamide and manipulated in such a manner as to selectively segregate the polyamide toward the front of a melt flow of the resin. Also, the invention relates to the addition of a compatibilizing agent in relatively small amounts to increase the interphase strength between the polyolefin and polyamide components, thereby overcoming the natural incompatibility of these two materials. The invention affords improved resistance to scratching, marring and gouging while maintaining the other well-recognized benefits of polyolefin alloys, such as superior moldability.

BACKGROUND OF THE INVENTION

Thermoplastic resins are commonly used in automotive interior components, such as instrument panels, and exterior components, such as bumpers and/or trim. Polypropylene resins are often used for these articles due at least in part to their superior moldability. Polypropylene resins offer a material that can be readily formed into components of various shapes and sizes by techniques well known in the art, such as injection and blow molding. Unfortunately, polypropylene demonstrates poor resistance to various types of surface impacts. Consequently, components manufactured from polypropylene resins often exhibit susceptibility to scratching, marring, and gouging.

Various techniques have been proposed for increasing the resistance of polyolefin resins, such as polypropylene, to surface impacts. For example, some current components utilize a migratory scratch protection package to bolster resistance to these defects. For example, work reported by Jack Chu (SPE ANTEC Proceedings, 1999) indicated that the use of high molecular weight "euracamides", when added to a thermoplastic olefin material, could increase the scratch propensity of the material. Work described by Dow Corning (SPE TPO in Automotive Proceedings, 2000) indicates that the use of high molecular weight siloxane masterbatches, when used in conjunction with thermoplastic olefins, can also increase the scratch resistance of the material. Unfortunately, while these add-ins may confer some protection against damage, they greatly limit other aspects of components manufactured from the modified polyolefin resin. For example, the scratch protection add-in may limit the paintability of the component, thereby reducing the ability to make the component visually appealing. Also, the add-in may evaporate or whiten over time, thereby causing a displeasing change in the visual appearance of the component over time. Other approaches include the addition of filler materials, such as silica, to a polyolefin material. JP 1318051 (Toray Siliconekk) discloses polyolefins that are modified in this manner. The silica filler may have been treated with silicone type compounds. The disclosed polyolefins, however, are not alloys.

The use of polyamides as add-ins to improve desirable qualities of polypropylene has been attempted. However, the natural incompatibility of these two materials causes a delamination effect and no desired material can be obtained by simple melt mixing. Therefore, if a polyamide is to be used to improve the qualities of polypropylene, the incompatibility of materials must be addressed. One approach to addressing this incompatibility is presented in Japanese Patent Publication No. 30945. The approach of this reference involves grafting a polypropylene with an unsaturated carboxylic acid or a derivative thereof. This approach makes a polypropylene and a polyamide compatible with each other. However, the approach of this reference is not satisfactory when an ordinary polyamide, such as nylon-6, nylon-6,6, and nylon-12, or the like, is used. To significantly improve the impact resistance of polypropylene by addition of a polyamide, the physical location of the polyamide in the alloy is critical.

U.S. Pat. No. 5,206,284 to Fukui, et al. teaches a polypropylene thermoplastic resin comprising, in part, a modified polypropylene obtained by grafting an unsaturated carboxylic acid or a derivative thereof, and a modified polyamide obtained by partially or wholly modifying a polyamide with a clay mineral. In this reference, the authors overcame the incompatibility of polypropylene and polyamide by modifying both the polypropylene and the polyamide. While this approach does overcome the incompatibility of these two materials and does not increase the heat stability of molded components, resins according to this approach still are prone to surface damage and have poor paintability.

Consequently, there is a need for a thermoplastic resin composition that retains the desirable attributes of a polyolefin alloy, e.g., superior moldability, while improving surface durability without imparting adverse properties, such as poor paintability and whitening, or decreased impact resistance, onto the polyolefin alloy.

SUMMARY OF THE INVENTION

The current invention provides the desired resin by teaching a resin comprising a polyolefin alloy, a polyamide, and a compatibilizing agent. The materials utilized in the resin have a difference between their respective melt flow rates such that the polyamide is selectively segregated to the surface of the component during the molding process. In this configuration, the polyamide, preferably nylon, provides excellent resistance to surface impacts. Compatibility between the polyolefin alloy and polyamide phases is obtained by the addition in small amounts of a compatibilizing agent. Also, the stiffness or modulus of molded parts can be increased by adding inorganic nanocomposite materials, such as clay, talc, silica, and wollastonite, to the resin.

DETAILED DESCRIPTION OF THE INVENTION

The present invention provides a thermoplastic resin that comprises a blend of a polyolefin alloy, a polyamide, and a compatibilizing agent. The polyolefin alloy, also commonly referred to as a thermoplastic olefin alloy, and polyamide components of the thermoplastic resin are selected so that the melt flow of each component is such that the polyamide selectively segregates itself towards the front of a melt flow of molten resin. This allows the thermoplastic resin of the present invention to achieve the desired results. That is, this property allows the polyamide to confer its resistance to surface impacts onto parts molded from the thermoplastic resin. The compatibilizing agent increases the strength between the polyolefin alloy and polyamide phases, thereby overcoming the natural incompatibility between these two phases. The thermoplastic resin of the present invention can also include a filler material to increase the stiffness or modulus of parts molded from the resin.

Polyolefin alloys are frequently used in the art as thermoplastic resins. These alloys are blends of a polyolefin with an alloy component, such as rubber. Essentially any polyolefin alloy can be used in the current invention, as long as its melt flow rate is sufficient as compared to that of the polyamide component. That is, the polyolefin alloy must have a lower melt flow rate than that of the polyamide. Having a lower melt flow rate, the alloy is the more viscous component of the blend and, therefore, is more resistant to flow than the polyamide component. This ensures that the polyamide component will migrate to the front of the melt flow during manufacturing of the resin and parts made therefrom. In preferred compositions, the polyolefin component can be any polyolefin suitable for use as a thermoplastic resin and able to form a desired alloy, such as polypropylene, polyethylene, blends of polypropylene with high density polyethylene, polypropylene blended with ethylene propylene copolymer, and polypropylene blended with ethylene butene copolymer. In preferred resin compositions according to the present invention, the alloy component can be rubber, styrene, acrylic, or ionomer. The alloying component is selected such that it imparts toughness, in particular impact resistance, to the polypropylene resin, when compounded. Particularly preferred as the polyolefin alloy is an alloy of polypropylene and rubber. This particular alloy is preferred because polypropylene has well characterized benefits as a base for thermoplastic resins, and the use of rubber as an alloy component imparts desired flexibility onto the alloy.

The selection of component types and amounts in the alloy is made such that the desired impact resistance balance is achieved while maintaining a desired modulus or stiffness. It has been determined that a ratio of polyolefin to the alloying material within the range of 70 weight % (wt %)/30 wt % to 90 wt %/10 wt %, inclusively, typically provides the desired balance between impact resistance and modulus. In the resin of the preferred embodiment, which utilizes a polypropylene/rubber alloy as the polyolefin alloy, a ratio within this range is preferred. A range of polypropylene/rubber ratios of 75 wt %/25 wt % to 80 wt %/20 wt % is particularly preferred.

The thermoplastic resin of the present invention includes as the second major component a polyamide. Polyamides are a group of high molecular weight polymeric materials in which amide linkages (CONH) occur along the molecular chain. Polyamides typically offer high resistance to surface impacts such as scratching, marring, and gouging. As indicated above, adding polyamides to polyolefin alloys is one approach to improving the resistance of these alloys to surface impacts. However, a natural incompatibility exits between polyamides and low surface free energy substrates such as a polypropylene/rubber alloy. In order to successfully create a thermoplastic resin composition of these two elements, this natural incompatibility must be overcome.

Essentially any polyamide can be used as the polyamide component in the thermoplastic resin of the present invention as long as it has a sufficient melt flow rate as compared to that of the polyolefin alloy. That is, the melt flow rate of the polyamide must be such that it imparts the desired difference between melt flow rates of the polyamide and polyolefin alloy components onto the thermoplastic resin. Thus, the polyamide component must have a higher melt flow rate than the polyolefin alloy component. That is, the polyamide component must be less viscous than the alloy. This relationship between the melt flow rates of the polyamide and the polyolefin alloy components is developed more fully below.

The inventors have found that nylon-6, nylon-6,6, nylon 4,6, nylon-6,10, nylon-9, nylon-11, nylon-12, nylon-6/6,6, and nylon-12,12 have been found suitable for use in thermoplastic resins according to the present invention. Nylon-6 is preferred as the polyamide component due to its acceptable melt flow rate in comparison to the preferred polyolefin alloy component, a polypropylene/rubber alloy. Also, nylon-6 is readily available and relatively inexpensive, making it desirable. Furthermore, Nylon-6 possesses relatively low hygroscopic properties in relation to other nylon materials.

The thermoplastic resin of the present invention achieves the desired selective segregation of the polyamide phase at the surface due to the inclusion of polyolefin alloy and polyamide components having appropriate melt flow rates. That is, during manufacturing of the thermoplastic resin, the molten resin must be such that the polyamide component migrates to the front of the melt flow. To achieve this selective segregation, the polyamide component must be less viscous than the polyolefin alloy component. The key to this is the difference between the melt flow rate of the polyolefin alloy component and the polyamide component. It has been found that a difference of one to twenty (1–20) between the melt flow rates of the polyolefin alloy and polyamide components is acceptable. A difference in melt flow rates greater than twenty (20) achieves an extreme localization of the polyamide component at the surface of the thermoplastic resin, and in fact may result in a delamination effect, causing separation of the polyamide component from the polyolefin alloy component. A difference of between one to ten (1–10) is particularly preferred and a difference of about two (2) is more particularly preferred.

In this application, the term 'melt flow rate' refers to the viscosity of a melted composition at a given temperature with a given weight driving the flow of molten material. Measurements of melt flow rates are conducted according to an international standard procedure, ISO 1133, entitled "*Determination of the Melt Mass-Flow Rate (MFR) and the Melt Volume-Flow Rate (MVR) of Thermoplastics*" (1997), using a weight of 2.16 kg. Measurements for melt flow rates are reported as grams per ten (10) minutes. For the preferred embodiment, the melt flow ratio of the selected polyamide to polyolefin alloy components is measured at 260° C. (for nylon) and 230° C. (for polypropylene) with 2.16 kg, and reported as g/10 min. The ratios of melt flow rates for nylon-6 to polypropylene/rubber alloy of the preferred embodiment typically range from 12/10 to 23.3/15, which corresponds to differences between melt flow rates of between 2 and 8.3. Differences between melt flow rates that lie within this range have been found to achieve the desired selective segregation, without leading to any extreme localization and the resulting delamination effect previously mentioned.

Melt flow rate and viscosity are a function of, among other factors, molecular weight. As the molecular weight of a polymer material increases, the melt flow rate decreases and viscosity increases. Thus, an appropriate combination of polyolefin alloy and polyamide components can be determined by first selecting the polyolefin alloy component, determining its melt flow rate, and subsequently selecting a polyamide having a suitable molecular weight, thereby ensuring the desired difference in melt flow rates between the two components.

The polyolefin alloy component, particularly with regard to the crystallinity of the polyolefin component of the blend, may be selected such that the modulus of the blend is affected. For example, high crystalline polypropylene may be utilized to achieve a higher modulus blend. The crystallinity of the polypropylene component can thus affect not only the stiffness of the final alloy but may also affect the migration of the nylon to the alloy surface through phase exclusion in the crystallization processes upon manufacture.

The thermoplastic resin of the present invention also includes a compatibilizing agent to overcome the natural incompatibility of the polyolefin alloy and polyamide components. The compatibilizing agent is a component that allows the polyamide to exist at the surface while increasing the cohesive strength between the polyolefin alloy and polyamide phases of the resin.

The thermoplastic resin of present invention utilizes siloxane-modified derivatives as the compatibilizing agents. These agents are able to increase the interfacial strength without substantially affecting the desired qualities of the resin, i.e., resistance to surface impacts, paintability, and low temperature ductility.

Essentially any siloxane-modified derivatives can be used as the compatibilizing agent in the thermoplastic resin according to the present invention. The following compatibilizing agents have been found to be suitable for use in thermoplastic resins according to the present invention: monopheryl, monopropyl siloxane, high molecular weight siloxane gum dispersed in high molecular weight silicone polyether, methyl-2-phenylpropyl functional polysiloxane, dimethyl, phenylmethyl silicone, terpolymer fluid, methyl long chain alkyl silicone wax, polymethyl siloxane fluid, and short chain siloxane.

The thermoplastic resin of the present invention can further comprise a filler material to increase the stiffness or modulus of molded parts created from the thermoplastic resin. However, the addition of such fillers typically has a negative effect on resistance to surface impacts. That is, the addition of fillers typically makes parts manufactured from resins less resistant to surface impacts. Thus, filler materials should only be used when increased stiffness is desired and necessary, such as with automobile bumpers, instrument panels, body panels (e.g., fenders), and rocker panel moldings. When a filler is used in the thermoplastic resin of the present invention, a balance must be found between the desire for an increase in stiffness and the ability to allow the part to have lower resistance to surface impacts and good low temperature ductility.

Various fillers are known in the art and essentially any of these fillers can be used. The inventors have found that hydrophobe modified wollastonite, clay talc silica, and wollastonite are acceptable and desirable filler materials due to their ease of dispersability in the alloy matrix and their particle size range availability. Particularly preferred as a filler material are calcium metasilicates (Wollastonite) with loose bulk density of 0.35 to 0.52 $g/cm^3$ and particle size diameters of 3 to 9 microns. The filler may be optionally surface treated with aminosilane or 3-methacryloxypropyltrimethoxysilane.

The composition of the thermoplastic resin according to the present invention therefore comprises a polyolefin alloy, a polyamide, and a compatibilizing agent. The resin may further include a filler material. The inventors have found that a resin containing $\leq 25$ wt % polyamide and 0.25 to 1.5 wt % compatibilizing agent, with the balance of the weight comprising polyolefin alloy, possesses the desired qualities. Preferably, the polyamide component constitutes $\leq 10$ wt %. Most preferable, the polyamide component comprises $\leq 5$ wt % of the resin. If a filler is used in the resin, it preferably comprises about 2 to 20 wt %. When a filler is utilized, the wt % of the compatibilizing agent must be increased by about 1%. Thus, for example, when a filler is utilized, the compatibilizing agent preferably comprises between 1.25 and 2.5 wt % of the resin.

Thermoplastic resins of the present invention can be prepared using an extruder capable of maintaining separate and distinct temperature zones between compartments in which the various components of the resin are added sequentially. This compartmentalization of temperature zones is necessary because the polyolefin alloy component may begin to degrade at temperatures at which the polyamide component is melted. Considering this, the use of a Werner-Pfleiderer twin-screw extruder has been found to be particularly well suited for manufacturing the thermoplastic resin of the present invention.

First, the polyamide is added into a compartment of the extruder having a temperature sufficient to melt the polyamide. If nylon-6 is used, 260° C. is a suitable temperature for this first compartment. It is preferred to use pellets of the polyamide component due to their availability and ease of handling. Next, the molten polyamide is transported to a downstream compartment of the extruder having a temperature that is suitable for melting the polyolefin alloy, but not so high as to degrade the alloy. Thus, if a polypropylene/rubber alloy is used as the polyolefin alloy, 225° C. is a sufficient and appropriate temperature. At this time and in this compartment, the compatibilizing agent is slowly added. As a siloxane, the compatibilizing agent is a liquid. Thus, a suitable amount is slowly dripped into the compartment onto the molten resin. Next, the molten resin is removed from the extruder and cooled in a water bath. Lastly, the extruded resin is pelletized using any of various methods known in the art. Following this procedure, the pellets of the resin according to the present invention are suitable for use in plastic manufacturing methods known in the art, such as injection and blow molding.

The thermoplastic resin of the present invention utilizes polyolefin alloy and polyamide components that have relative melt flow rates that ensure selective segregation of the polyamide component at the front of the melt flow. Thus, when molten resin is poured, the polyamide selectively segregates itself to the front of the melt flow. As a result, the polyamide is localized at the surface of a component being manufactured from the thermoplastic resin of the present invention. Also, the thermoplastic resin of the present invention includes a compatibilizing agent to increase the strength between the polyolefin alloy and polyamide components. This ensures sufficient interphase strength to hold the phases together. The thermoplastic resin of the present invention may further include a filler material when increased stiffness is desired. As a result of this composition, thermoplastic resins according to the present invention have excellent resistance to surface damage, such as scratching, marring, and gouging, while still retaining desirous features of the polyolefin alloy, such as superior moldability. Furthermore, the composition is such that the compatibilizing agent does not impart undesirous characteristics, such as poor paintability, etc.

These characteristics make the resin appropriate and suitable for use in various plastic components, including interior and exterior automobile components, industrial parts, and any other molded plastic component that requires the moldability and other benefits of polyolefin alloys as well as an improved resistance to surface impacts.

The thermoplastic resin of the present invention is described in more detail below by way of Examples.

However, the following specific examples are merely illustrative in nature, and are not intended in any way to limit the scope of the present invention.

EXAMPLES

In the Examples, resin pellets produced in the compounding steps were introduced into a 5"×5" plaque tool inserted into a 350 ton Cincinnati Milacron injection molding machine. The pellets were melted at 260° C. and introduced into the tool, which was cooled to 80° C. The total cycle time was 45 seconds. The following characteristics were measured on the plaques produced previously with the indicated test methods:

1. Resistance to Surface Impact:

Five Finger Scratch Test, FLTM BN 108-13, indentors with 1.0 mm±0.1 mm diameter, with various loads ranging from 0.6 to 7 Newtons (N). Scratch resistance testing was performed at room temperature (25° C.), relative humidities of 50%, and scratch velocities of 100 mm/min.

Following the surface impact resistance test, various measurements were taken, including total material displaced (initial and final microns), percent-displaced material recovery, volume recovered ($cm^3/m^2$), and percent volume recovery.

2. IZOD Impact Strength (IZOD):

Izod impacts (ASTM D256 Method A) were performed at 0° C. with a weight of five-pounds. Impact energies are reported in J/m.

All compounds were prepared by adding the desired amount of nylon (10 weight percent) in the first zone of the Werner-Pfeider twin screw extruder set at 260° C. equipped with a general compounding screw. The polyolefin alloy component was added into the second zone of the extruder, with the zone set at 230° C. The siloxane component (0.1 wt % based on total solids levels), and if desired, the filler component, was added directly after the polyolefin alloy component via a sight glass opening. The siloxane, if in liquid form, was metered into the molten nylon/polyolefin alloy mixture directly in the compounding screw.

The composition of the Examples are as follows:

Example 1

3463 TPO (AMTUF 3463, no polyamide); m.p. 170° C., melt flow rate 15 g/10 min at 230° C., 2.16 kg. Note that AMTUF is a trademark of bp polymers, and 3463 is a reactor grade thermoplastic olefin alloy containing polypropylene and elastomer.

Example 2

3463/8202 (polyolefin alloy/nylon-6/no compatibilizing agent); 8202 is nylon-6, m.p. 235° C., melt flow rate of 10–12 g/10 min at 260° C., 2.16 kg, from Honeywell.

Example 3

3463/BAC (polyolefin alloy/nylon/no compatibilizing agent); BAC is diterminated nylon-6, with a melt flow rate of 20–25 g/10 min at 260° C., 2.16 kg, from Honeywell.

Examples 4–11

Example 3 with various compatibilizer agents added as indicated in the table.

Example 12

Example 3 with C18PP (maleated polypropylene, Eastman Chemical) as compatibilizing agent.

Example 13

Example 3 with E43PP (maleated polypropylene, Eastman Chemical) as a compatibilizing agent.

TABLE I

| Example Number | Polyolefin Alloy/ Polyamide/ Compatibilizing Agent, if present* | Injection Velocity (in/sec) | Five Finger Scratch (Volume Removed) $cm^3/m^2$ | Izod (5 lb) (J/m) |
|---|---|---|---|---|
| 1 | 3464 TPO | 0.5/3 | 3.68 | 317 |
|   |   |   | 3.61 | 323 |
| 2 | 3463/8202 | 0.3/3 | 2.37 | 118 |
|   |   |   | 2.07 | 125 |
| 3 | 3463/BAC | 0.5/3 | 2.74 | 209 |
|   |   |   | 2.6 | 177 |
| 4 | 3463/BAC/ DC Z-6018 | 0.5/3 | 2.33 1.88 | 209 270 |
| 5 | 3463/BAC/ DC23238 | 0.5/3 | 2.5 2.49 | 228 186 |
| 6 | 3463/BAC/ DC230 | 0.5/3 | 1.86 1.9 | 236 200 |
| 7 | 3463/BAC/ DC510 | 0.5/3 | 2.14 2.31 | 217 206 |
| 8 | 3463/BAC/ DC203 | 0.5/3 | 1.77 1.76 | 231 207 |
| 9 | 3463/BAC/ DC2503 | 0.5/3 | 1.74 1.93 | 209 218 |
| 10 | 3463/BAC/ DC200 | 0.5/3 | 1.84 1.76 | 150 161 |
| 11 | 3463/BAC/ DC25212 | 0.5/3 | 1.86 1.9 | 117 88 |
| 12 | 3463/BAC C18PP | 0.5/3 | 1.93 2.17 | 94 77 |
| 13 | 3463/BAC/E43PP | 0.5/3 | 2.36 2.23 | 94 77 |

*compatibilizing agent, when added to the alloy blend for Examples 4–11, is indicated by "DCXXXX", where DC is a representation for the Dow Corning Corporation material represented by the # XXXX. For Examples 12 and 13, C18PP and E43PP, maleated polypropylenes from Eastman Chemical, were added as compatibilizing agents.

All of the Examples were tested for resistance to surface impacts by using the five-finger scratch test and IZOD tests listed above. The results of these tests for all Examples, including Comparative Examples, are presented in Table 1.

The results of these tests, as Table 1 clearly illustrates, demonstrate the desired qualities of thermoplastic resins according to the present invention. The results show that using a polyolefin alloy and polyamide with suitable differences in their respective flow rates, along with a compatibilizing agent, have positive results on resistance to surface impacts (i.e., the quantity of damage decreases). Also, as illustrated by the evaluation of the Examples 12 and 13, which contain E-43PP and C-18PP maleated polypropylene as compatibilizing agents, it can be seen that the resin according to the present invention shows demonstrated benefits over polyolefin alloy and polyamide alone, and over polyolefin alloy and polyamide using maleated polypropylene as a compatibilizing agent.

The foregoing disclosure is the best mode devised by the inventors for practicing the invention. It is apparent, however, that several variations in thermoplastic resins in accordance with the present invention may be obvious to one skilled in the art. Inasmuch as the foregoing disclosure is intended to enable one skilled in the pertinent art to practice the instant invention, it should not be construed to be limited thereby but rather should be construed to include such aforementioned obvious variations and be limited only by the spirit and scope of the following claims.

We claim:

1. A thermoplastic resin, comprising:
   at least 94% by weight of a polyolefin alloy having a melt flow rate determined by testing according to ISO 1133 with a weight of 2.16 kg to be between 10 and 15;
   about 5% by weight of a polyamide having a melt flow rate determined by testing according to ISO 1133 with a weight of 2.16 kg to be between 12 and 23.3; and
   about 1% by weight of a compatibilizing agent, wherein the compatibilizing agent is a siloxane compatibilizer;
   wherein the difference between said melt flow rate for said alloy and said melt flow rate for said polyamide is between 1 and 20, such that the polyamide segregates to the surface of the resin.

2. A thermoplastic resin according to claim 1 wherein said polyolefin alloy comprises an alloy of polypropylene and rubber.

3. A thermoplastic resin according to claim 2 wherein said polyolefin alloy comprises 70 to 90% by weight of polypropylene and 10 to 30% by weight rubber.

4. A thermoplastic resin according to claim 2 wherein said polyolefin alloy comprises 75 to 80% by weight of polypropylene and 20 to 25% by weight rubber.

5. A thermoplastic resin according to claim 1 wherein said polyamide is nylon-6.

6. A thermoplastic resin according to claim 1 wherein said compatibilizing agent is methyl-2-phenylpropyl functional polysiloxane.

7. A thermoplastic resin according to claim 1 wherein said difference between said melt flow rate of said alloy and said melt flow rate of said polyamide is between 1 and 10.

8. A thermoplastic resin according to claim 1 wherein said difference between said melt flow rate of said alloy and said melt flow rate of said polyamide is about 2.

9. A thermoplastic resin, comprising:
   at least 89% by weight of a polyolefin alloy having a melt flow rate determined by testing according to ISO 1133 with a weight of 2.16 kg to be between 10 and 15;
   about 5% by weight of a polyamide having a melt flow rate determined by testing according to ISO 1133 with a weight of 2.16 kg to be between 12 and 23.3;
   about 5% by weight of a filler material; and
   about 1% by weight of a compatibilizing agent, wherein the compatibilizing agent is a siloxane compatibilizer.

10. A thermoplastic resin according to claim 9 wherein said polyolefin alloy comprises an alloy of polypropylene and rubber.

11. A thermoplastic resin according to claim 9 wherein said polyolefin alloy comprises 70 to 90% by weight of polypropylene and 10 to 30% by weight rubber.

12. A thermoplastic resin according to claim 9 wherein said polyolefin alloy comprises 75 to 80% by weight of polypropylene and 20 to 25% by weight rubber.

13. A thermoplastic resin according to claim 9 wherein said polyamide is nylon-6.

14. A thermoplastic resin according to claim 9 wherein said compatibilizing agent is methyl-2-phenylpropyl functional polysiloxane.

15. A thermoplastic resin according to claim 9 further comprising about 5% by weight of a filler material.

16. A thermoplastic resin according to claim 9 wherein difference between said melt flow rate of said alloy and said melt flow rate of said polyamide is between 1 and 20.

17. A thermoplastic resin according to claim 9 wherein difference between said melt flow rate of said alloy and said melt flow rate of said polyamide is between 1 and 10.

18. A thermoplastic resin according to claim 9 wherein difference between said melt flow rate of said alloy and said melt flow rate of said polyamide is about 2.

19. A thermoplastic resin for use in injection molding, the thermoplastic resin comprising:
   at least 94% by weight of a polyolefin alloy having a melt flow rate determined by testing according to ISO 1133 with a weight of 2.16 kg to be between 10 and 15;
   about 5% by weight of a polyamide having a melt flow rate determined by testing according to ISO 1133 with a weight of 2.16 kg to be between 12 and 23.3; and
   about 1% by weight of a compatibilizing agent; where in compatibilizing agent is a siloxane compatibilizer;
   wherein the difference between said melt flow rate for said alloy and said melt flow rate for said polyamide is between 1 and 20 such that the polyamide to the surface.

* * * * *

UNITED STATES PATENT AND TRADEMARK OFFICE
CERTIFICATE OF CORRECTION

PATENT NO.     : 6,605,656 B2
DATED          : August 12, 2003
INVENTOR(S)    : Rose A. Ryntz et al.

It is certified that error appears in the above-identified patent and that said Letters Patent is hereby corrected as shown below:

Title page,
Item [56], References Cited, OTHER PUBLICATIONS, third reference, delete "Additive" and substitute -- Additives -- in its place.

Column 10,
Line 36, delete "where in" and substitute -- wherein -- in its place.
Line 40, after "the polyamide" insert -- segregates --.
Line 41, delete "surface." and substitute -- surface off the resin. -- in its place.

Signed and Sealed this

Twentieth Day of January, 2004

JON W. DUDAS
*Acting Director of the United States Patent and Trademark Office*